United States Patent
Endou

[11] Patent Number: 5,714,871
[45] Date of Patent: Feb. 3, 1998

[54] POWER DEVICE FOR INTERNAL COMBUSTION ENGINE

[75] Inventor: Tsuneaki Endou, Numazu, Japan

[73] Assignee: Kokusan Denki Co., Ltd., Shizuoka-ken, Japan

[21] Appl. No.: 580,585

[22] Filed: Dec. 29, 1995

[51] Int. Cl.$^6$ ............................................. H02P 9/44
[52] U.S. Cl. ............................................. 322/28; 322/29
[58] Field of Search ................................. 322/10, 16, 17, 322/25, 28

[56] References Cited

U.S. PATENT DOCUMENTS

| | | | |
|---|---|---|---|
| 4,382,222 | 5/1983 | Kurtz et al. | 320/61 |
| 4,459,536 | 7/1984 | Wirtz | 322/10 |
| 4,780,619 | 10/1988 | Campbell et al. | 307/10 R |
| 4,811,185 | 3/1989 | Cook et al. | 365/17 |
| 5,448,154 | 9/1995 | Kanke et al. | 322/28 |
| 5,543,703 | 8/1996 | Kusase et al. | 322/16 |

FOREIGN PATENT DOCUMENTS

| | | |
|---|---|---|
| 59-35538 | 2/1984 | Japan . |
| 5-344798 | 12/1993 | Japan . |
| 5-344799 | 12/1993 | Japan . |

*Primary Examiner*—Steven L. Stephan
*Assistant Examiner*—Nicholas Ponomarenko
*Attorney, Agent, or Firm*—Pearne, Gordon, McCoy & Granger LLP

[57] ABSTRACT

A power device for an internal combustion engine is disclosed, which includes a rectification power section equipped with a voltage regulator and using an AC magneto driven by the internal combustion engine as a power supply therefor, a switch circuit including at least one MOSFET acting as a switching element and adapted to carry out short circuit between output terminals of the AC magneto, and an FET control circuit for repeatedly subjecting the MOSFET to on-off operation when an output voltage of the rectification power section is at a set level or below and keeping the MOSFET turned off when the output voltage exceeds the set level. The MOSFET is subjected to on-off operation during a low speed operation of the internal combustion engine to boost an output voltage of the AC magneto, to thereby provide a voltage for driving a load. On-off operation of the MOSFET is interrupted when an output voltage of the rectification power section exceeds the set level, so that loss due to switching of the MOSFET is reduced.

8 Claims, 9 Drawing Sheets

Fig. 3
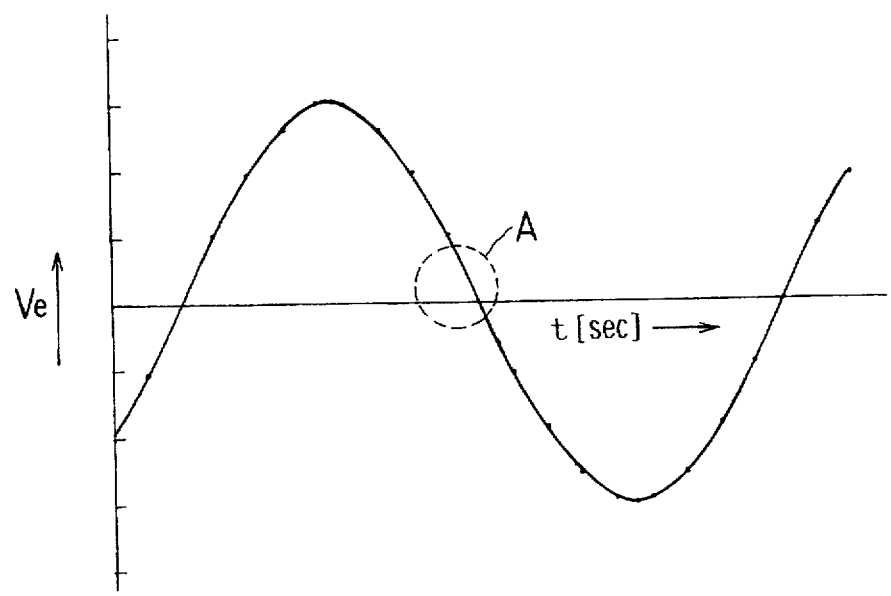
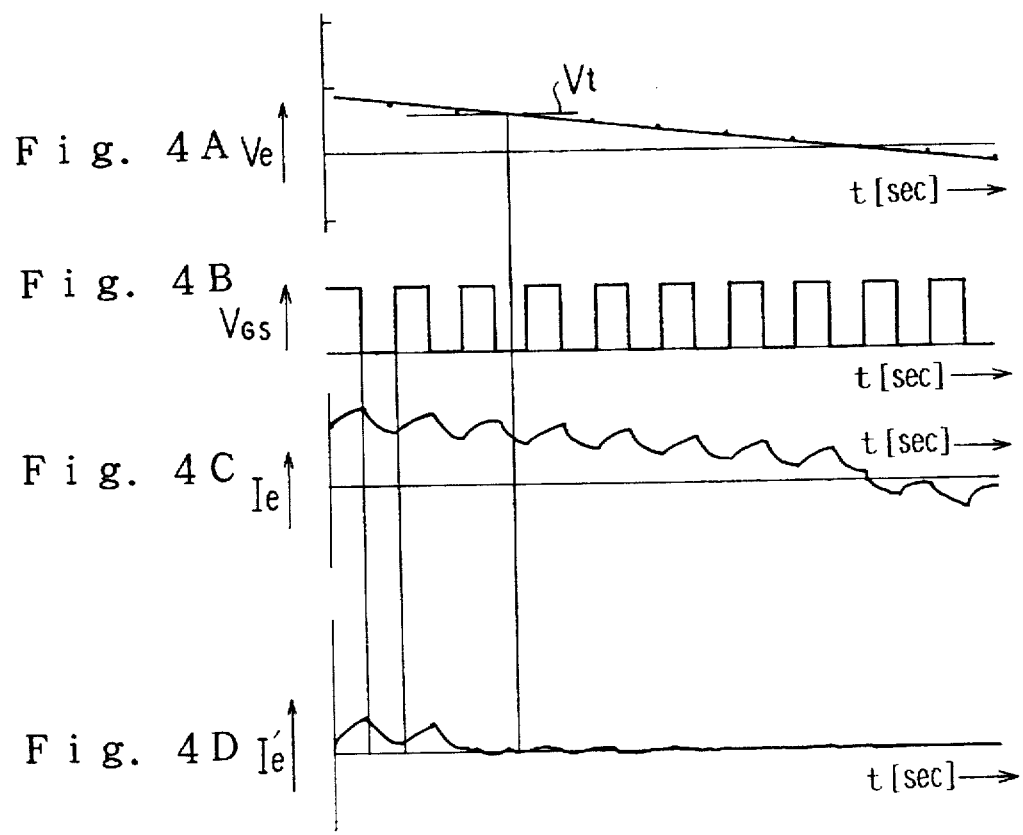
Fig. 4A $V_e$
Fig. 4B $V_{GS}$
Fig. 4C $I_e$
Fig. 4D $I_e'$

POWER DEVICE FOR INTERNAL COMBUSTION ENGINE

BACKGROUND OF THE INVENTION

This invention relates to a power device for an internal combustion engine, and more particularly to a power device for an internal combustion engine which is adapted to generate an output for driving a load while permitting an AC magneto mounted on the internal combustion engine to serve as a power supply.

A generator which has been conventionally mounted on an internal combustion engine is generally constituted by an AC magneto including a magnet rotor mounted on an output shaft of the engine and a stator fixed on a casing of the engine or a cover thereof. The AC magneto generates an alternating current; therefore, when a vehicle is provided with electrical parts required to be driven by a direct current, it is required to arrange a rectification circuit for converting an AC output of the AC magneto into a DC output.

When a battery is mounted on a vehicle, a working equipment or the like which is driven by the internal combustion engine, the battery and a DC load are connected in parallel across the rectification circuit for rectifying the output of the AC magneto. This results in an electric power being fed from the battery to the load while a rotational speed of the internal combustion engine is decreased to a degree sufficient to cause the output voltage of the AC magneto to be below a terminal voltage of the battery and being fed from the AC magneto to the load when the output voltage of the AC magneto exceeds the terminal voltage of the battery.

Recently, it has been considered that in an internal combustion engine for a vehicle, a working equipment or the like which is constructed so as not to be mounted with any battery, a power device in which an AC magneto mounted on the engine is used as a power supply therefor is adapted to function to drive a fuel pump, an injector and a microcomputer for controlling the fuel pump and injector.

In order to ensure that the power device in which the AC magneto driven by the internal combustion engine is used as the power supply generates an output necessary to drive a load during low-speed operation of the internal combustion engine as well, it is considered to increase the number of windings of a generating coil of the AC magneto, to thereby increase an output voltage thereof. Unfortunately, an increase in the number of windings of the generating coil leads to an increase in inductance of the generating coil, as well as an increase in resistance of the generating coil, resulting in an impedance of the generating coil being increased. Such an increase in impedance of the generating coil causes an output voltage of the AC magneto to be reduced to a degree sufficient to fail to feed the load with an electric power in a sufficient amount during medium-speed or high-speed operation of the internal combustion engine.

Thus, a demand of increasing an output voltage of the AC magneto when the engine speed is reduced and a demand of feeding the load with an electric power of a sufficient level are contrary to each other for the AC magneto, so that the prior art fails to provide a power device which is capable of satisfying both demands.

In view of the above, a power device is proposed which includes a full-wave rectification circuit for rectifying a voltage induced across a generating coil of an AC magneto, transistors each having a collector-emitter circuit connected between each of output terminals of the generating coil and a DC output terminal on a negative side of the full-wave rectification circuit so as to act as a boosting switch, and a control circuit for on-off operation of each of the transistors. The proposed power device is disclosed in Japanese Patent Application Laid-Open Publication No. 344798/1993 and Japanese Patent Application Laid-Open Publication No. 344799/1993. The power device proposed is so constructed that when each of the transistors is turned on, a short-circuit current is permitted to flow through the transistor and one of diodes constituting the full-wave rectification circuit to the generating coil; whereas when the transistor is turned off, the short-circuit current is interrupted to induce a boosted voltage across the generating coil. The voltage induced is then rectified by the full-wave rectification circuit and then fed to a load.

Such construction of the proposed power device permits an increased voltage to be induced across the generating coil of the AC magneto during low-speed operation of an internal combustion engine as well, resulting in the load being driven during the low-speed operation as well. Also, it permits the number of windings of the generating coil of the AC magneto to be decreased to a degree sufficient to reduce an impedance thereof, to thereby prevent a decrease in output voltage of the magneto during both middle-speed operation and high-speed operation of the engine.

Nevertheless, the conventional power device disclosed in each of Japanese Patent Application Laid-Open Publication No. 344798/1993 and Japanese Patent Application Laid-Open Publication No. 344799/1993 described above, when the transistor is turned on, causes each of the diodes and the collector-emitter circuit of the transistor acting as the boosting switch to be connected in series to a circuit for short-circuiting the generating coil, to thereby fail to permit flowing of a short-circuit current through the generating coil unless an output voltage of the AC magneto exceeds a threshold voltage Vt corresponding to a sum of a collector-emitter saturation voltage VCB of the transistor and a forward voltage drop VF of the diode which occurs across the diode when a forward current flows through the diode. Thus, the conventional power device exhibits a disadvantage of failing in boosting operation by on-off operation of the transistor, when a rotational speed of the engine is at a highly low level, to thereby cause a voltage induced across the generating coil to be at a highly low level as in manual starting operation of the engine.

Also, the power device which uses the AC magneto driven by the internal combustion engine as a power supply therefor is required to be controlled so as to prevent a voltage applied to the load when a rotational speed of the engine is increased from being excessively increased. In the conventional power device which includes the boosting circuit for boosting an output voltage of the AC magneto by on-off operation of the transistor, the output voltage can be adjusted by controlling a duty ratio of on-off operation of the transistor. The duty ratio is defined to be a ratio Ton/T of an on-period Ton of the transistor to a cycle T of on-off operation thereof. Unfortunately, adjustment of the output voltage by only control of the duty ratio of on-off operation of the transistor causes switching loss in the boosting circuit to be increased, leading to a further increase in generation of heat from the boosting circuit.

SUMMARY OF THE INVENTION

The present invention has been made in view of the foregoing disadvantage of the prior art.

Accordingly, it is an object of the present invention to provide a power device for an internal combustion engine which is capable of satisfactorily driving a load over a range between highly low speed operation of the engine and high speed operation thereof.

It is another object of the present invention to provide a power device for an internal combustion engine which is capable of reducing switching loss in a switch circuit for boosting an output voltage of an AC magneto.

In accordance with the present invention, a power device for an internal combustion engine is provided. The power device includes an AC magneto driven by the internal combustion engine and including output terminals, a rectification power section equipped with a voltage regulator and constructed so as to output a DC voltage adjusted to be at a predetermined adjustment level or below while using the AC magneto as a power supply therefor, a switch circuit including at least one MOSFET acting as a switching element and arranged so as to carry out short-circuit between the output terminals of the AC magneto, and an FBT control circuit for controlling the MOSFET depending on an output voltage of the rectification power section in a manner to feed the MOSFET of the switch circuit with a drive signal of a rectangular waveform to cause the MOSFET to carry out on-off operation when the output voltage of the rectification power section is at a set level or below and keep the MOSFET turned off when the output voltage of the rectification power section exceeds the set level.

In general, the AC magneto includes n (n: an integer of 2 or more) output terminals and the rectification power section is constructed of a rectification circuit for subjecting an AC voltage induced between each two of the n output terminals of the AC magneto to full-wave rectification and a voltage regulator for controlling an output of the rectification circuit so as to keep the output at a predetermined adjustment level or below. In this instance, the switch circuit may comprise a plurality of MOSFETs of which sources are connected together and drains are respectively connected to a plurality of output terminals of the AC magneto. In this instance, the FET control circuit is constructed so as to control the MOSFETs of the switch circuit depending on an output voltage of the rectification power section in a manner to feed the MOSFETs of the switch circuit with a rectangular-waveform drive signal of an identical phase repeatedly generated to cause the MOSFETs to concurrently carry out on-off operation when the output voltage of the rectification power section is at a set level of below and keep the MOSFETs turned off when the output voltage of the rectification power section is above the set level.

The switch circuit may be constructed of n MOSFETs of the N channel type arranged so as to correspond in number to the output terminals of the AC magneto. In this instance, the n output terminals of the AC magneto are respectively connected to anodes of n rectification diodes of which cathodes are connected together and the n MOSFETs each have a parasitic diode in a drain-source circuit thereof. The parasitic diodes cooperates with the n rectification diodes to constitute a diode bridge full-wave rectification circuit, wherein an output of the diode bridge full-wave rectification circuit and an output of the rectification power section are applied to load connection terminals.

Alternatively, when the switch circuit is constructed of n MOSFETs of the P channel type, the n output terminals of the AC magneto are respectively connected to cathodes of n rectification diodes of which anodes are connected together and the n MOSFETs each have a parasitic diode in a drain-source circuit thereof. The parasitic diodes cooperates with the n rectification diodes to constitute a diode bridge full-wave rectification circuit, wherein an output of the diode bridge full-wave rectification circuit and an output of the rectification power section are applied to load connection terminals.

The FBT control circuit preferably carries out operation while using the AC magneto as a power supply therefor.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein;

FIG. 3 is a waveform diagram showing an example of a waveform of a non-load output voltage of an AC magneto;

FIG. 4 is a group of waveform diagrams each showing a waveform obtained when an FBT and a bipolar transistor each are used as a switching element for short-circuiting a generating coil of an AC magneto in the power device of FIG. 1;

FIG. 7 is a diagrammatic view showing drain-source-resistance to drain-current characteristics of a MOSFET when the MOSFET is turned on;

DETAILED DESCRIPTION OF THE PREFERRED EMBODIMENTS

Now, a power device for an internal combustion engine according to the present invention will be described hereinafter with reference to the accompanying drawings.

Figure 1:
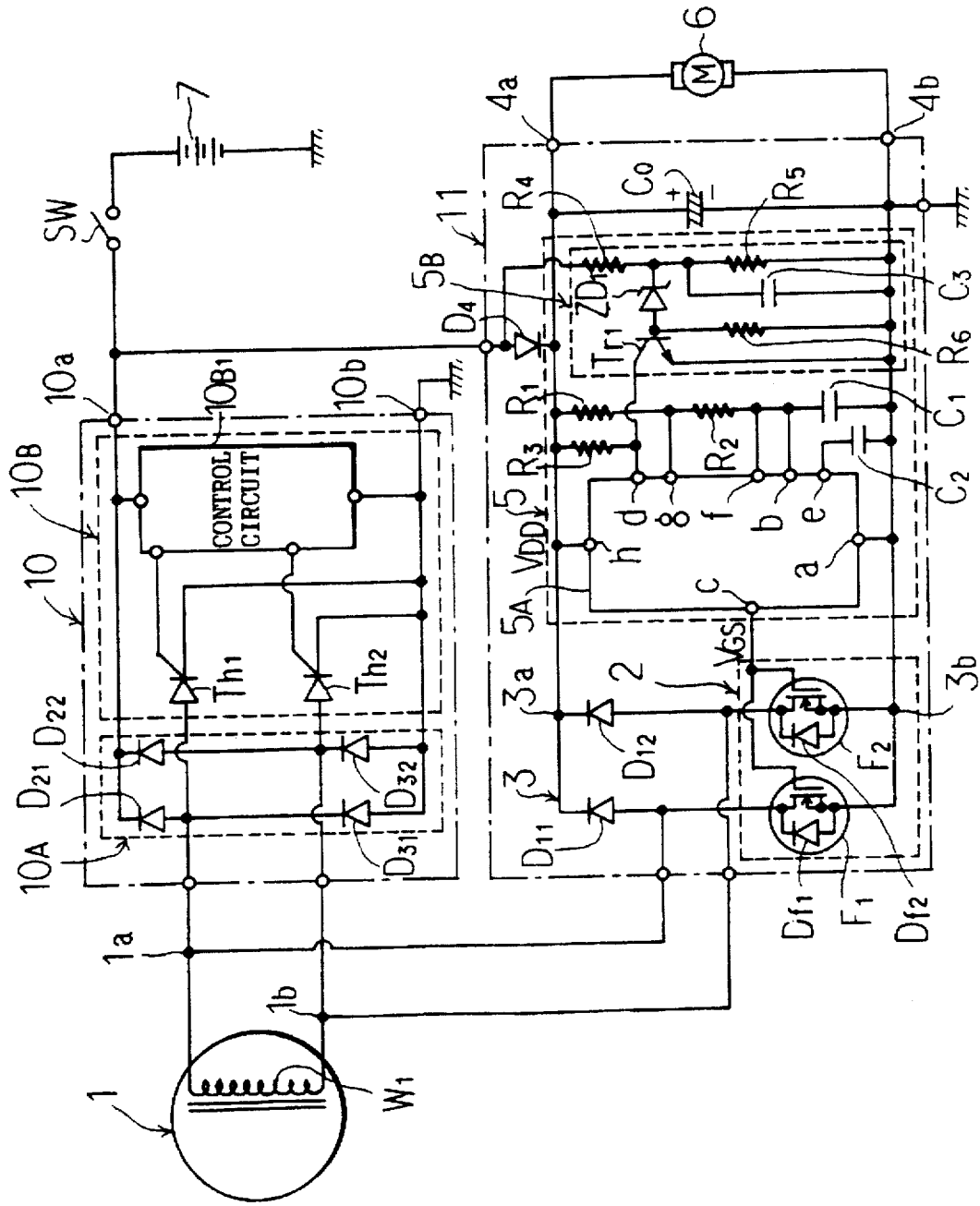
FIG. 1 is a circuit diagram showing an embodiment of a power device for an internal combustion engine according to the present invention.

Referring first to FIG. 1, an embodiment of a power device for an internal combustion engine according to the present invention is illustrated. A power device of the illustrated embodiment generally includes an AC magneto 1 mounted on an internal combustion engine, a rectification power section 10 for subjecting an output of the AC magneto 1 to full-wave rectification to generate a DC voltage adjusted so as not to exceed a predetermined adjustment level, and a boosting circuit 11 for boosting an output voltage of the AC magneto 1.

In the illustrated embodiment, the AC magneto 1 includes a magnet rotor mounted on an output shaft of the internal combustion engine and a stator fixed on a stator mounting section provided on a casing of the engine or a cover thereof, as widely known in the art. The AC magneto 1 includes a generating coil W1 arranged on a side of the stator and subjected to connection which permits it to generate a single-phase AC output. The generating coil W1 has output terminals 1a and 1b led out of both ends thereof. The generating coil W1 is constructed so as to be decreased in the number of windings and exhibit a reduced impedance, resulting in a current in a large amount being fed from the generating coil W1 during high speed operation of the engine.

The rectification power section 10 includes diodes D21 and D22 of which anodes are respectively connected to the output terminals 1a and 1b of the AC magneto 1 and cathodes are connected to each other or together, a diode bridge single-phase full-wave rectification circuit 10A, and a voltage regulator 10B. The diode bridge single-phase full-wave rectification circuit 10A is constituted by diodes D31 and D32 of which cathodes are respectively connected to the output terminals 1a and 1b of the AC magneto 1 and anodes are connected together. The voltage regulator 10B functions to control an output voltage of the AC magneto 1 so as to restrict an output voltage of the rectification circuit 10A to a predetermined adjustment level or below. The rectification circuit 10A includes an AC input terminal to which an output voltage of the AC magneto 1 is applied. The rectification power section 10 has a DC output terminal 10a arranged on a positive polarity side thereof and connected through a switch SW to a positive terminal of a battery 7 and a DC output terminal 10b arranged on a negative polarity side thereof and grounded. The battery 7 has a negative terminal grounded.

The voltage regulator 10B includes thyristors Th1 and Th2 of which anodes are respectively connected to the output terminals 1a and 1b of the AC magneto 1 and cathode are grounded, as well as a control circuit 10B1 for controlling feed of a trigger signal to each of the thyristors Th1 and Th2 depending on an output voltage of the rectification circuit 10A. The control circuit 10B1 functions to interrupt feed of a trigger signal to the thyristors Th1 and Th2 when an output voltage of the rectification circuit 10A is at the predetermined adjustment level or below and permit feed of the signal to the thyristors Th1 and Th2 when the output voltage exceed the adjustment level. Thus, when the AC magneto is at a low rotation speed, resulting in an output voltage thereof being at a low level, the thyristors Th1 and Th2 are kept turned off to permit an output voltage of the AC magneto 1 to be fed through the rectification circuit 10A to a load; whereas when a rotation speed of the AC magnet is increased to cause an output of the rectification circuit 10A to exceed the adjustment level, the thyristors Th1 and Th2 are turned on to bypass an output of the AC magneto 1 from the load, to thereby reduce an output voltage of the rectification circuit 10A. Such operation causes an output voltage of the rectification circuit 10A to be restricted to the adjustment level or below, so that an output voltage of the rectification circuit 10A is kept at the adjustment level during rotation of the AC magneto at a certain rotational speed or above.

The boosting circuit 11 includes a switch circuit 2, rectification diodes D11 and D12 of which anodes are respectively connected to the output terminals 1a and 1b of the AC magneto 1, an FET control circuit S, a smoothing capacitor Co, and a diode D4 arranged for interrupting interference between the rectification power section 10 and the boosting circuit 11. The switch circuit includes MOSFETs F1 and F2 of the N channel type of which drains are connected to the output terminals 1a and 1b of the AC magneto 1, respectively.

Sources of the MOSFETs F1 and F2 and cathodes of the rectification diodes D11 and D12 are connected together, respectively. The MOSFET F1 has a parasitic diode Df1 arranged in a drain-source circuit thereof and likewise the MOSFET F2 has a parasitic diode Df2 arranged in a drain-source circuit thereof. The parasitic diodes Df1 and Df2 cooperate with the rectification diodes D11 and D12 to provide a diode bridge single-phase full-wave rectification circuit 5. The rectification circuit 3 has a DC output terminal 3a arranged on a positive polarity side thereof, which is connected to a load connection terminal 4a on a positive polarity side of the power device. The rectification circuit 3 also has a DC output terminal 3b on a negative polarity side thereof, which is grounded together with a load connection terminal 4b on a negative polarity side of the power device. The diode D4 has a cathode connected to a connection between the positive-side DC output terminal 3a of the rectification circuit 3 and the load connection terminal 4a and an anode connected to the positive-side output terminal 10a of the rectification power section 10.

The FBT control circuit S is constituted by a timer IC 5A; an astable multivibrator including resistors R1 to R3 and capacitors C1 and C2 respectively connected to predetermined terminals of the timer IC 5A; and a reset circuit 5B including a transistor Tr1, a Zener diode ZD1, resistors R4 to R6 and a capacitor C3.

In the illustrated embodiment, a product manufactured and sold under a tradename "μPD SSSS" by Nippon Denki Kabushiki Kaisha may be used as the timer IC 5A. In FIG. 1, terminals a and b serve as a ground terminal and a trigger terminal, respectively. Terminals c and d act as an output terminal and a reset terminal, respectively. Also, terminals e and f act as a control terminal and a threshold terminal, respectively, and terminals g and h function as a discharge terminal and a power terminal, respectively.

The power terminal h of the timer IC 5A is connected to the output terminal 3a of the rectification circuit 3, as well as to the output terminal 10a of the rectification power section 10 through the diode D4, so that a power voltage VDD may be applied from the AC magneto 1 through the rectification circuit 3 and rectification power section 10 to the timer IC 5A. Thus, it will be noted that the timer IC 5A carries out operation using the AC magnet 1 as a power supply therefor.

The above-described resistors R1 and R2 are connected between the discharge terminal g of the timer Ic and the power terminal h thereof and between the discharge terminal g and the threshold terminal f, respectively, and the capacitor C1 is connected between the threshold terminal f and the ground. The trigger terminal b is connected to the threshold terminal f and the reset terminal d is connected through the resistor R3 to the power terminal h. The capacitor C2 is connected between the control terminal e and the ground.

The transistor Tr1 of the reset circuit 5B has an emitter grounded and a collector connected to the resent terminal d of the timer IC 5A. The resistors R4 and R5 are connected in series to each other to constitute a voltage dividing circuit, which is connected between the output terminals 10a and 10b of the rectification power section 10. The voltage dividing circuit has a voltage dividing point connected to a cathode of the Zener diode ZD1. The Zener diode has an anode connected to a base of the transistor Tr1, so that a base current is fed to the transistor Tr1 when a divided output voltage induced across the resistor R5 exceeds a Zener voltage of the Zener diode ZD1.

The resistor R6 is connected between the base of the transistor Tr1 and the emitter thereof and the capacitor C3 is connected across the resistor R5. The voltage dividing circuit constituted by the resistors R4 and R5 provides a voltage detection circuit for detecting an output voltage of the rectification power section 10, to thereby permit an output voltage of the voltage detection circuit to reach a level sufficient to turn on the Zener diode ZD1 when an output voltage of the voltage detection circuit reaches a set level. When an output voltage of the rectification power section 10 is kept above the set level, the Zener diode ZD1 is turned on, to thereby a base current to be fed to the transistor Tr1. This results in the transistor Tr1 being turned on, so that a potential at the reset terminal d of the timer IC 5A is reduced to reset the timer IC. The set level of an output voltage of the rectification power section 10, which is a value of an output voltage of the rectification power section when the reset circuit carries out reset operation, is determined to be lower than an adjustment voltage level of the rectification power section. For example, it may be set to be 10 (V). When a voltage of the battery is 12 (V), the adjustment voltage level of the rectification power section 10 is set to be about 14.5 (V).

The smoothing capacitor Co is connected between the load connection terminals 4a and 4b. Also, in the illustrated embodiment, a motor (pump motor) 6 for driving a fuel pump for feeding fuel to an injector of an electronic fuel injection unit is connected in the form of a load between the load connection terminals 4a and 4b.

The electronic fuel injection unit may be controlled by a CPU. In this instance, it is preferable that a power may be fed from the load connection terminals 4a and 4b to the CPU, so that the CPU may be driven by means of an output of the AC magneto 1 even when the battery 7 is not serviceable.

In the astable multivibrator using the timer IC 5A, the timer IC is self-triggered to carry out astable operation because the trigger terminal b of the timer IC 5A is connected to the threshold terminal f. When an output voltage of the timer IC or a voltage between the output terminal c and the ground is at a high level, the capacitor C1 is charged through the resistors R1 and R2 by means of a power supply voltage VDD. When a voltage across the capacitor C1 reaches a level two third as high as the power supply voltage VDD, the threshold terminal f is rendered turned on, to thereby cause the output voltage to be at a low level. At this time, charges in the capacitor C1 are discharged through the resistor R2 and discharge terminal g. When the discharge causes a voltage across the capacitor C1 to be reduced to a level of ($\frac{1}{3}$) VDD, the trigger terminal b is rendered turned on, to thereby cause the output voltage to be at a high level. This results in the capacitor C1 being re-charged through the resistors R1 and R2 by means of the power supply voltage. The above-described operation is repeated, so that a voltage of a rectangular waveform is generated between the output terminal c and the ground. The rectangular-waveform voltage is then applied to the gates of the MOSFETs F1 and F2, to thereby act as a drive signal VGS therefor. Oscillation of the astable multivibrator is started when the power supply voltage VDD is applied to the power terminal h of the timer IC and stopped when an output voltage of the rectification power section 10 exceeds the set level to cause the transistor Tr1 of the resent circuit 5B to be turned on.

In the astable multivibrator, charge time t1 of the capacitor C1 when the output voltage is at a high level and discharge time t2 of the capacitor C1 when the output voltage is at a low level are given by the following expressions (1) and (2):

$$t1=0.693(R1+R2)C1 \quad (1)$$

$$t2=0.693 \cdot R2 \cdot C1 \quad (2)$$

Thus, a cycle T of a rectangular-waveform signal outputted is given by the following expression (3):

$$T=t1+t2=0.693(R1+2R2)C1 \quad (3)$$

An oscillation frequency f is given by the following expression (4):

$$f=1/T=1.44/(R1+2R2)C1 \quad (4)$$

The oscillation frequency is set at a level substantially higher than an output frequency of the generating coil W1.

Also, a duty cycle D (=t2/T) of the rectangular-waveform signal is given by the following expression (5):

$$D=R2/(R1+2R2) \quad (5)$$

In the embodiment shown in FIG. 1, the following description will be made on the assumption that starting operation of the internal combustion engine is carried out under the conditions that the battery 7 is not serviceable. When starting operation of the engine is carried out, the AC magneto 1 generates an AC voltage. The AC voltage thus generated is then rectified by the rectification circuit 10A, so that the rectification circuit 10A generates a DC voltage, which is then applied between the load connection terminals 4a and 4b through the diode D4. Initially, the DC voltage is below the set level, so that an output voltage of the voltage dividing circuit constituted by the resistors R4 and R5 does not reach a level sufficient to turn on the Zener diode ZD1. This fails to cause the transistor Tr1 to be turned on, so that it does not affect the timer IC 5A.

An output voltage of the AC magneto 1 is also fed through the rectification circuit 3 to the load connection terminals 4a and 4b, as well as to the power terminal of the timer IC 5A. The timer IC 5A starts operation at a voltage as low as 3 (V), so that the astable multivibrator oscillates to generate a rectangular-waveform signal of a constant frequency f, which is concurrently fed to the gate-source circuits of the MOSFETs F1 and F2. This permits the MOSFETs F1 and F2 to concurrently carry out on-off operation, resulting in boosting operation taking place.

Now, boosting operation by the switch circuit 2 constituted by the MOSFETs F1 and F2 will be described hereinafter.

Figure 2:
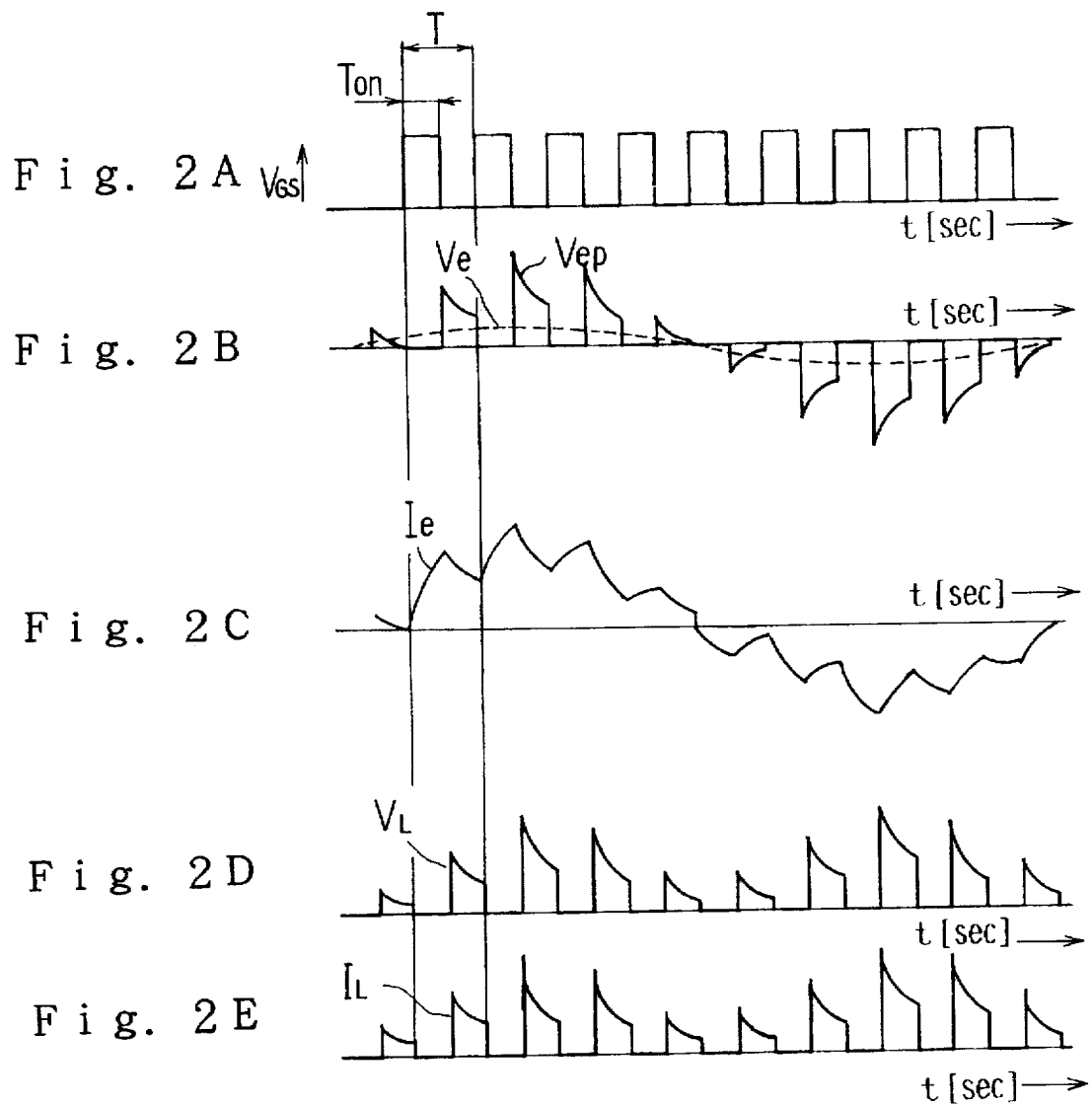
FIG. 2 is a group of waveform diagrams each showing a waveform of a signal obtained at each of sections of the power device shown in FIG. 1.

The FBT control circuit 5 generates a rectangular-waveform signal ((A) of FIG. 2) having a frequency substantially higher than a frequency of an output of the generating coil W1, which signal is fed in the form of a drive signal VGS of an identical phase to the gate-source circuit of each of the MOSFETs F1 and F2, so that both MOSFETs may be concurrently driven. When the gate-source circuit of each of the MOSFETs F1 and F2 is fed with a drive signal VGS of a polarity which permits the gate to have a potential positive relatively to the source, both MOSFETs F1 and F2 may be turned on, so that even slight application of a voltage of a polarity which permits the drain to have a potential positive relatively to the source to the drain-source circuit of each of the MOSFETs F1 and F2 results in a drain current flowing through each of the MOSFETs, to thereby permit a short-circuit current to flow to the generating coil W1 of the AC magneto 1 during a period Ton for which the drive signal VGS is fed to the MOSFETs. When the drive signal VGS is rendered zero, the MOSFETs F1 and F2 are turned off to interrupt flowing of the short-circuit current through the generating coil W1, so that a voltage Vep ((B) of FIG. 2) boosted in a direction which is to continue flowing of the short-circuit current to the generating coil W1 is induced across the generating coil W1. The voltage thus induced permits such a current Ie as shown in (C) of FIG. 2 to be flowed to the generating coil W1, so that such a load current IL as shown in (B) of FIG. 2 is flowed through the full-wave rectification circuit constituted by the diodes D11 and D12 and parasitic diodes Df1 and Df2 to the load 6. (D) of FIG. 2 shows a waveform of a voltage VL across the load 6.

Figure 5A:
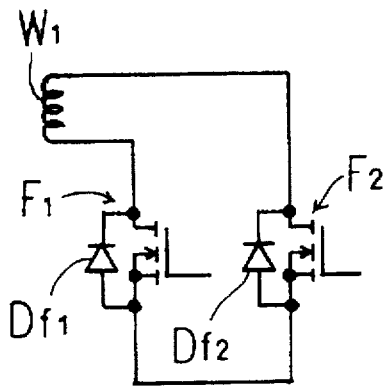
FIG. 5A is a circuit diagram showing a short circuit for a generating coil in the power device of FIG. 1.

The power device shown in FIG. 1, as shown in FIG. 5A, is so constructed that the short circuit (boosting switch circuit) for the generating coil W1 is constituted by the two MOSFETs F1 and F2. A MOSFET generally has bidirectionality, therefore, construction of only the two MOSFETs F1 and F2 into the short circuit for the generating coil W1 permits a short-circuit current to be flowed to the generating coil W1 in both positive and negative half-cycles of an output voltage of the generating coil W1. This eliminates a necessity of arranging a diode for rectification in the short circuit for the generating coil W1.

Figure 5B:
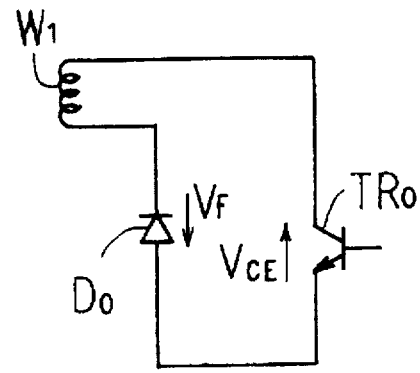
FIG. 5B is a circuit diagram showing a short circuit for a generating coil in a power device in which a transistor is substituted as a boosting switch for a MOSFET.

On the contrary, when a boosting and rectifying circuit is constituted by a full-wave rectification circuit for rectifying a voltage induced across the generating coil W1 and a transistor of which a collector-emitter circuit is connected between each of the output terminals of the generating coil and an output terminal on a negative polarity side of the full-wave rectification circuit, a circuit for flowing a short-circuit current to the generating coil W1 is constructed as shown in FIG. 5B, wherein a diode Do and a collector-emitter circuit of a transistor TRo are connected in series to each other.

The construction shown in FIG. 5B wherein the series circuit of the collector-emitter circuit of the transistor TRo and the diode Do is connected across the generating coil W1 fails to permit a short-circuit current to be flowed to the generating coil W1 unless an output voltage of the AC magneto 1 exceeds a threshold voltage Vt corresponding to a sum of a saturation voltage VCE across the collector-emitter circuit of the transistor TRo and a forward voltage drop Vf of the diode Do. For example, use of a transistor manufactured and sold under a tradename "2SC3710" by Kabushiki Kaisha Toshiba as the transistor TRo shown in FIG. 5B causes the saturation voltage VCE across the collector-emitter circuit of the transistor TRo at a temperature of 25° C. to be 0.04 (V) or more. Also, use of a diode manufactured and sold under a tradename "20DL2C41A" by Kabushiki Kaisha Toshiba as the diode Do causes the forward voltage drop at a temperature of 25° C. to be 0.6 (V) or more. Thus, in this instance, the circuit shown in FIG. 5B fails to permit a short-circuit current to be flowed through the generating coil W1 unless a voltage induced across the generating coil W1 exceeds Vt=VCB+VF=0.64 (V).

Figure 6:
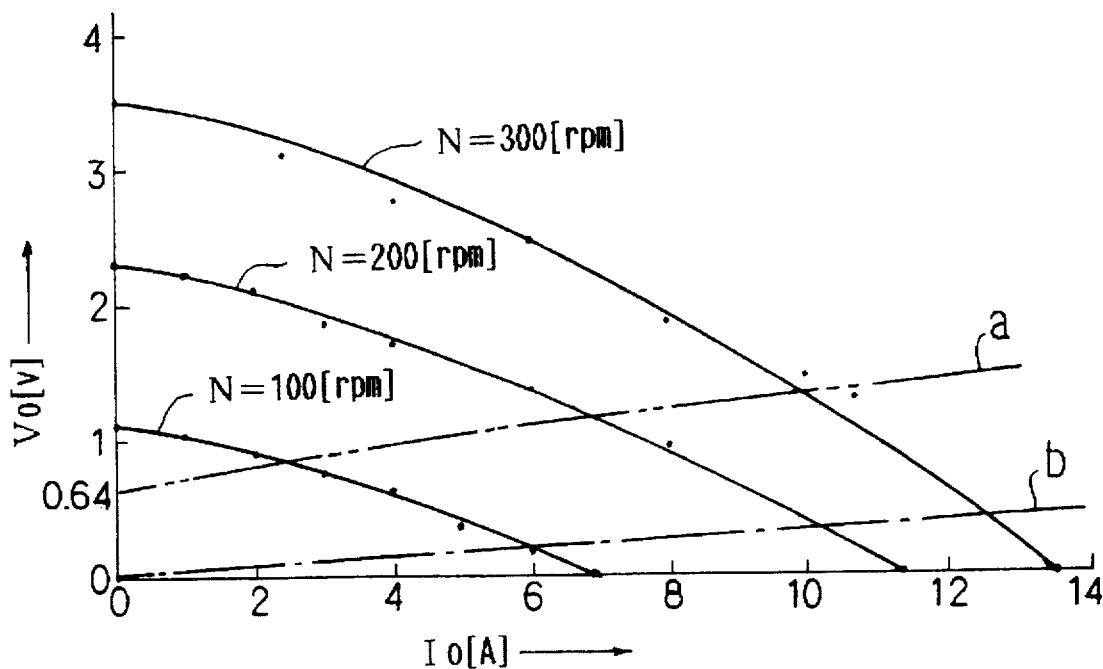
FIG. 6 is a diagrammatic view showing output-voltage to output-current characteristics of an AC magneto, as well as a load line thereof in the power device of FIG. 1.

An example of characteristics of an output current Io of the AC magneto 1 to an output voltage Vo thereof during a highly low speed operation (100 rpm to 300 rpm) of the internal combustion engine is illustrated in FIG. 6, wherein N indicates a rotational speed (rpm) of the internal combustion engine. When an AC magneto having such characteristics as shown in FIG. 6 is combined with the above-described commercially available transistor and diode for the transistor TRo and diode Do in order to provide such a boosting switch circuit as shown in FIG. 5B, a load line of the load connected to the generating coil W1 is as indicated at a line a in FIG. 6. In this instance, in order to interrupt flowing of a short-circuit current from the generating coil W1 through the diode Do and transistor TRo to carry out boosting operation, the AC magneto 1 is required to induce a voltage above the threshold voltage Vt=0.64 (V). When a rotational speed of the internal combustion engine is at a level low sufficiently to fail to permit an output voltage of the AC magneto to reach the threshold level of 0.64 (V), the circuit of FIG. 5B fails to flow a short-circuit current through the generating coil W1, resulting in failing to carry out boosting operation.

Figure 7:
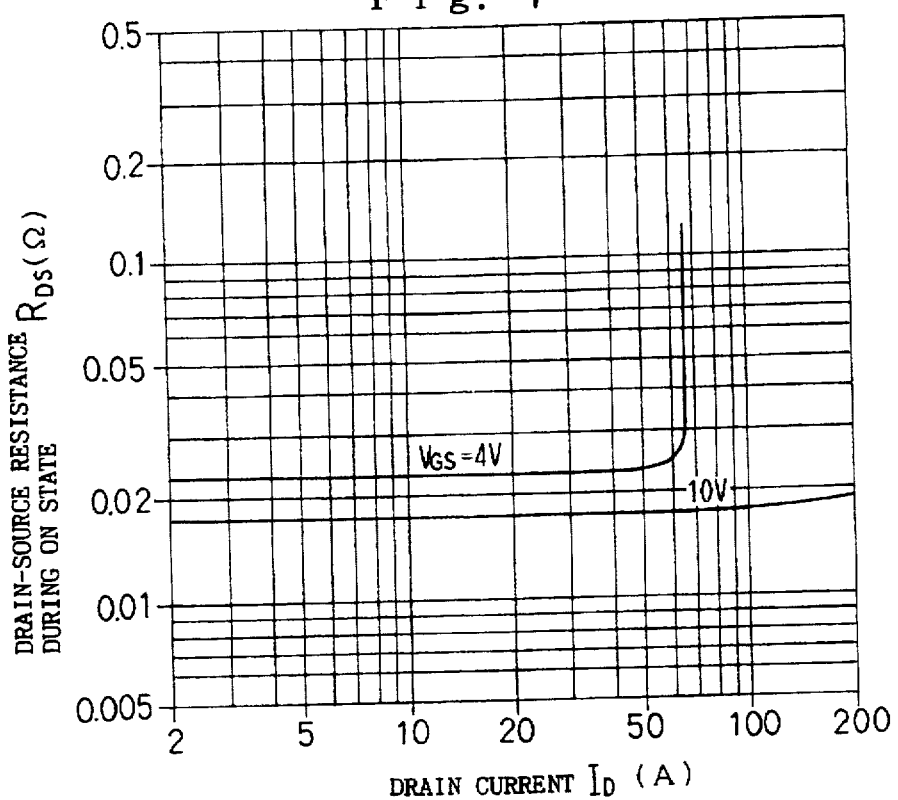
Figure 8:
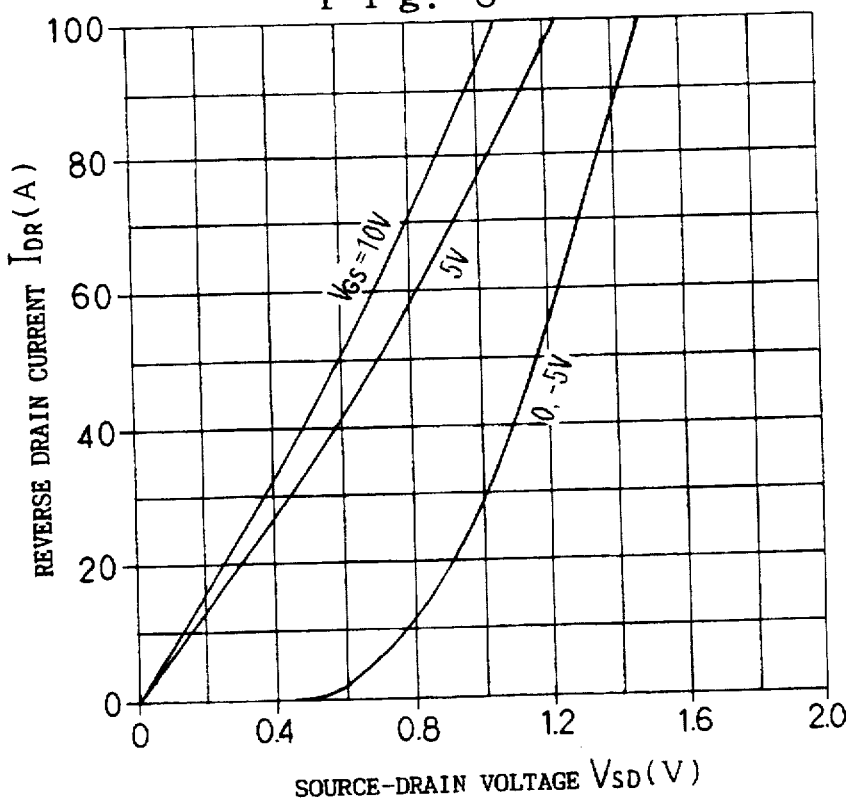
FIG. 8 is a diagrammatic view showing reverse-drain-current to source-drain-voltage characteristics of the MOSFET of FIG. 7.

On the contrary, in the illustrated embodiment, the short circuit for the generating coil W1 is free of any diode as shown in FIG. 5A and the MOSFETs have bidirectionality, to thereby exhibit a function like a resistor while it is kept fed with a drive signal, so that even slight application of the voltage VSD to the source-drain current of each of the MOSFETs permits a drain current ID to be flowed through the MOSFET. For example, when a product manufactured and sold under a tradename "2SK1911" by Kabushiki Kaisha Hitachi is used as each of the MOSFETs, the MOSFET exhibits such characteristics of a drain-source resistance RDS to a drain current ID as shown in FIG. 7, as well as such characteristics of a reverse drain current IDR to a source-drain voltage VSD as shown in FIG. 8. In FIGS. 7 and 8, VGS indicates a drive signal applied to the gate-source circuit of the MOSFET. Thus, it will be noted that while a drive signal VGS of a polarity which permits the source of the MOSFET to have a potential positive relatively to the gate thereof is kept applied to the gate-source circuit of the MOSFET, the drain-source resistance exhibits a constant value over a wide range, thus, there exists substantially proportional relationship between the drain current and the source-drain voltage VSD or the MOSFET can be substantially regarded as a resistor.

Thus, the circuit constructed by connecting the series circuit (boosting switch circuit) of the two MOSFETs fed with a drive signal across the generating coil W1 is equivalent to a circuit formed by connecting a resistor across the generating coil, so that a load line of the AC magneto 1 obtained while the two MOSFETs are kept fed with a drive signal concurrently is as indicated at a line b in FIG. 6 which passes through an origin (0, 0). Therefore, a threshold voltage required to turn on the MOSFETs is rendered substantially zero, so that even slight induction of a voltage across the generating coil W1 of the AC magneto 1 permits a short-circuit current to be flowed through the two MOSFETs F1 and F2 to the generating coil W1. Thus, even when a rotational speed of the engine is at a highly low level as in rope starting of the engine, even slight induction of a voltage across the generating coil W1 permits the MOSFETs F1 and F2 to be turned on to flow a short-circuit current to the generating coil, so that a boosted voltage may be induced across the generating coil when a drive signal of each of the MOSFETs F1 and F2 is extinguished to interrupt the short-circuit current.

The following description will be described on the assumption that the AC magneto 1 generates such an AC voltage Ve of a non-load voltage waveform as shown in FIG. 3. (A) of FIG. 4 shows a waveform near a zero point of an output voltage of the AC magneto 1 or at a region indicated at A in FIG. 3 while enlarging a time axis of FIG. 3 and (B) of FIG. 4 shows a waveform of a drive signal VGS given at the gate of each of the MOSFETs. Also, (C) of FIG. 4 shows a waveform of a current Ie flowed to the generating coil W1. Thus, it will be noted that the illustrated embodiment permits flowing of the current Ie even when the voltage Ve is rendered substantially zero. Therefore, the illustrated embodiment permits a short-circuit current to be flowed to the generating coil W1 even when a voltage induced across the generating coil is at a highly low level, so that a voltage may be induced across the generating coil due to interruption of the short-circuit current, to thereby drive the load even when a rotational speed of the engine is at a highly low level.

On the contrary, when the short circuit for the generating coil W1 is constituted by the series circuit of the diode Do and the collector-emitter circuit of the transistor TRo as shown in FIG. 5B, a current Ie' is not permitted to be fed to the generating coil W1 when an output voltage Ve of the AC magneto 1 is below the threshold voltage Vt; so that a period of time which permits a short-circuit current to be fed to the generating coil W1 is reduced, resulting in a DC current which can be fed to the load during a extremely low engine speed as in rope starting of the engine being decreased in total amount.

Figure 9:
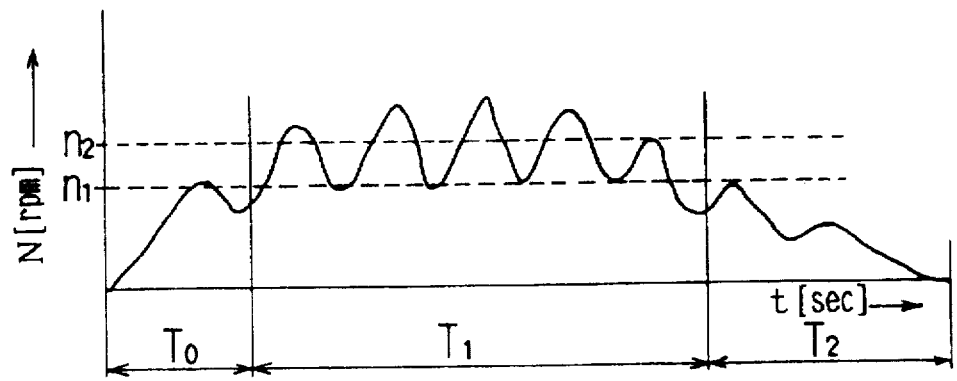
FIG. 9 is a diagrammatic view showing a variation in cranking revolving speed obtained when starting operation of an internal combustion engine is manually carried out.

A wave-like line shown in FIG. 9 indicates a variation in cranking rotational speed N of the engine obtained when a rope is drawn for rope starting of the engine. When the power device shown in FIG. 5B is used, the boosting switch circuit merely functions to feed the load with a DC current only during a period T1, so that an average value of the cranking rotational speed in the period T1 is N2. More particularly, in the case that a battery is not arranged, feeding of a power to the load is failed when drawing of the rope fails to permit an average value of the cranking rotational speed to be N2. On the contrary, the illustrated embodiment permits a power to be fed to the load over all of periods T0, T1 and T2, so that an average value of the cranking rotational speed (or an average rotational speed over the periods T0 to T2) required for feeding the load with a power may be reduced to N1 (<N2), to thereby facilitate starting of the engine.

In the illustrated embodiment, it is essential to concurrently turn on the MOSFETs F1 and F2 in on-off operation of the MOSFETs. A delay in turning-on of one of the MOSFETs causes a forward voltage drop of the parasitic diode arranged in the drain-source circuit of the MOSFET delayed to be a threshold voltage of the short circuit, so that it fails to exhibit such advantages as described above.

Also, use of the MOSFETs each of which is a voltage control element as the boosting switch element for short-circuiting and interrupting the generating coil as described above leads to a decrease in loss in the switch element when the generating coil is short-circuited, to thereby reduce generation of heat from the power device, resulting in a heat sink to be mounted on the switch element being small-sized.

As described above, the boosting circuit 11 incorporated in the power device of the embodiment shown in FIG. 1, even when a rotational speed of the engine during starting operation thereof is at a highly low level as in rope starting of the internal combustion engine, permits a current to be flowed through the MOSFETs when a voltage is induced in a slight amount across the generating coil, resulting in starting boosting operation. Therefore, the boosting circuit 11 permits a relatively high voltage to be applied to the load even during a highly low rotational speed of the engine, so that the load may be effectively driven during a highly low engine speed.

In particular, use of the power device of the illustrated embodiment as a power device for driving a motor of a fuel pump for feeding fuel to an injector of an electronic fuel injection unit permits the engine to be smoothly started even when the engine is manually started due to excessive discharge of the battery or when the injector or fuel pump is driven by means of only an output of the AC magneto 1 without using any battery.

In the power device of FIG. 1, an output voltage of each of the rectification power section 10 and rectification circuit 3 reaches the set level, the pump motor 6 is permitted to normally operate, so that fuel may be fed from the fuel pump to the injector, resulting in the electronic fuel injection unit starting operation. Thus, operation of the internal combustion engine is started.

When the engine thus starts operation, resulting in a rotational speed of the engine being increased, an output voltage of the AC magneto 1 exceeds the set level, to thereby turn on the transistor Tr1 of the reset circuit 5B, leading to a decrease in potential at the reset terminal d of the timer IC 5A, so that oscillation of the astable multivibrator is stopped. Thus, an increase in output of the rectification power section 10 above the set level fails to permit the MOSFETs F1 and F2 to be fed with a drive signal, so that boosting operation is interrupted.

When a rotational speed of the engine is further increased to cause an output voltage of the rectification power section 10 to be above the adjustment voltage level described above, the control circuit 10B1 feeds the thyristors Th1 and Th2 with a trigger signal to turn on both thyristors. This causes an output of the AC magneto 1 to be bypassed from the load connection terminals through the thyristors Th1 and Th2, so that an output voltage of the rectification power section 10 is reduced to the adjustment voltage level. The thyristors Th1 and Th2 are rendered turned off when a polarity of a current flowed through the generating coil W1 is reversed.

When an output voltage of the rectification power section 10 is reduced to the adjustment voltage level, feed of a trigger signal to the thyristors Th1 and Th2 is interrupted, so that the thyristors Th1 and Th2 fail to be turned on, resulting in an output voltage of the generating coil W1 being rectified through the rectification circuit 10A and then fed to the load. Such operation causes the rectification power section 10 to be controlled so as not to exceed the adjustment voltage level.

Then, in the embodiment of FIG. 1, it is supposed that starting operation of the internal combustion engine takes place under the conditions that the battery 7 is normally serviceable or operable and the switch SW is kept closed. When the switch SW is kept closed, a voltage (12 (V)) of the battery 7 is applied across the series circuit of the resistors R4 and R5, resulting in the transistor Tr1 of the reset circuit 5B being turned on. At this time, the astable multivibrator including the timer IC 5A does not carry out oscillation, therefore, the MOSFETs F1 and F2 do not carry out on-off operation, so that boosting operation does not take place.

When a voltage of the battery 7 is reduced to the set level or below during starting operation of the internal combustion engine due to driving of a cell motor for a long period of time or the like, the transistor Tr1 of the reset circuit 5B is rendered turned off. This permits the astable multivibrator to initiate oscillation, so that a drive signal of a fixed frequency f is fed to the MOSFETs F1' and F2. This results in the MOSFETs F1 and F2 carrying out on-off operation, leading to an increase in output voltage of the AC magneto 1.

As described above, the illustrated embodiment is so constructed that the MOSFETs constituting the switch circuit 2 carry out on-off operation only when an output voltage of the rectification power section 10 is at the set level or below. Thus, the FET control circuit S is merely required to generate a rectangular-waveform pulse (drive signal) of a fixed frequency and is not needed to control a duty cycle of a drive signal fed to the MOSFETs F1 and F2. When a frequency of a drive signal fed to the MOSFETs is thus rendered constant, the FET control circuit 5 may be simplified in structure. Also, the illustrated embodiment permits a period during which the MOSFETs carry out on-off operation to be restricted to a short period of time during Starting operation of the internal combustion engine, so that generation of heat from the MOSFETs may be minimized, to thereby small-size a heat sink for the MOSFETs.

In the illustrated embodiment, as described above, the FET control circuit S is adapted to generate a drive signal of a fixed frequency. Alternatively, the FET control circuit may be constructed so as to generate a drive signal of which a duty cycle is varied depending on an output voltage of the rectification circuit 3, to thereby restrict an output voltage of the rectification circuit 3 to a predetermined level or below.

Further, the illustrated embodiment is so constructed that the AC magneto 1 generates a single-phase AC output. Alternatively, the AC magneto may be constructed so as to generate a polyphase AC output such as a three-phase AC output or the like.

Figure 10:
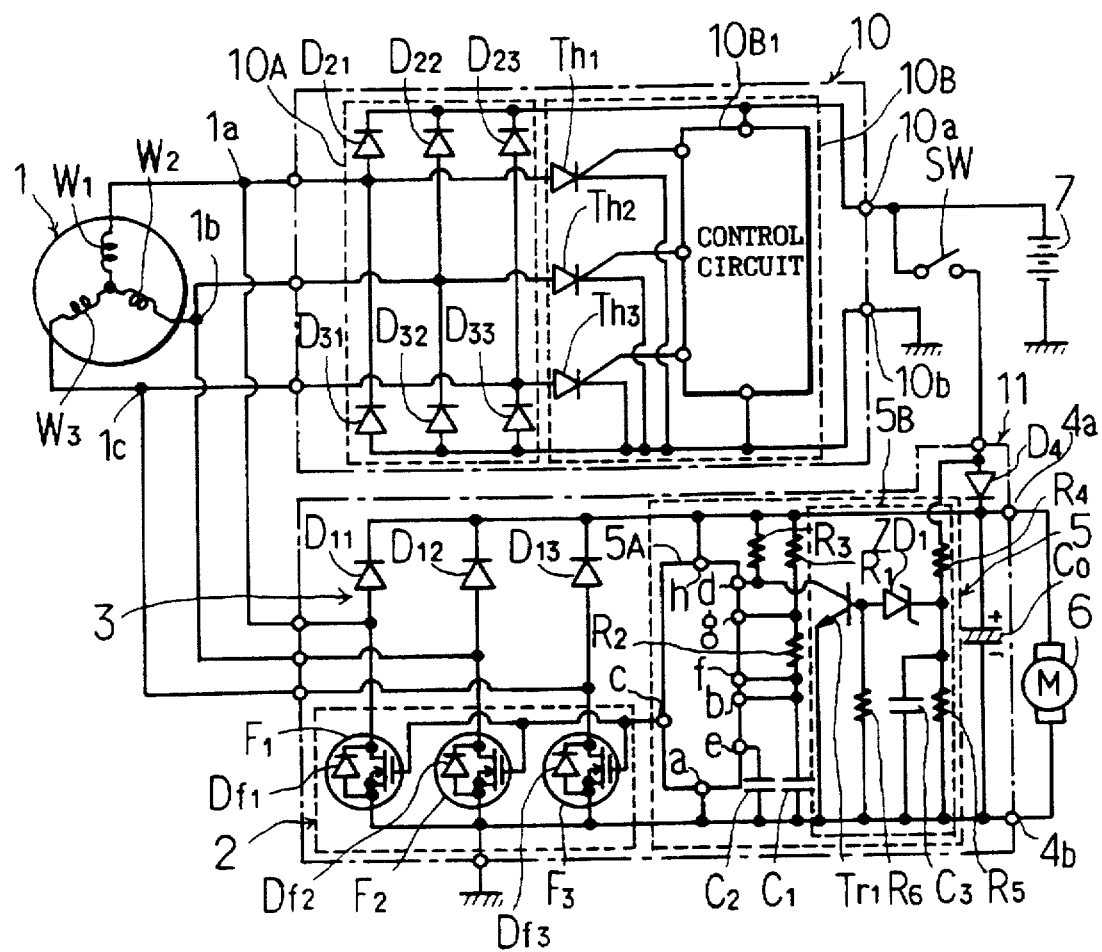
FIG. 10 is a circuit diagram showing another embodiment of a power device for an internal combustion engine according to the present invention.

Referring now to FIG. 10, another embodiment of a power device for an internal combustion engine according to the present invention is illustrated. A power device of the illustrated embodiment includes an AC magneto 1 constructed so as to generate a three-phase AC output. For this purpose, the AC magneto 1 includes a stator having generating coils W1 to W3 for three phases, which are subject to star connection. The generating coils W1 to W3 each are decrease in the number of windings, resulting in an impedance thereof being sufficiently decreased.

In the illustrated embodiment, the AC magneto 1 has three output terminals 1a to 1c connected to drains of power MOSFETs F1 to F3 of the N channel type, respectively, of which sources are connected to each other or together and then grounded. Also, the three output terminals 1a to 1c of the AC magneto 1 are respectively connected to anodes of rectification diodes D11 to D13, of which cathodes are connected together. The MOSFETs F1 to F3 cooperate with each other to provide a switch circuit 2 and include parasitic diodes Df1 to Df3, respectively, which cooperate with rectification diodes D11 to D13 to provide a diode bridge three-phase full-wave rectification circuit 3. The MOSFETs F1 to F3 each have a gate-source circuit fed with a rectangular-waveform drive signal of an identical phase from an FBT control circuit 5.

The power device of the illustrated embodiment also includes a rectification power section 10 having a rectification circuit 10A incorporated therein. The rectification circuit 10A comprises a diode bridge three-phase full-wave rectification circuit, which is constituted by diodes D21 to D23 of which anodes are respectively connected to the output terminals 1a to 1c of the AC magneto 1 and cathodes are connected together, as well as diodes D31 to D33 of which cathodes are respectively connected to the output terminals 1a to 1c and anode are connected together.

The rectification power section 10 also includes a voltage regulator 10B, which is constituted by thyristors Th1 to Th3 of which anode are respectively connected to the output terminals 1a to 1c of the AC magneto 1 and cathodes are grounded and a control circuit 10B1 for feeding a trigger signal to a gate of each of the thyristors Th1 to Th3 when an output voltage of the rectification circuit 10A exceeds an adjustment voltage level. Also, in the illustrated embodiment, the rectification power section 10 has an output terminal 10a on a positive polarity side thereof connected through a switch SW to an anode of a diode D4, so that an output voltage of the rectification power section 10 may be applied between load connection terminals 4a and 4b of the power device through the switch SW and diode D4.

The remaining part of the illustrated embodiment may be constructed in substantially the same manner as the embodiment described above with reference to FIG. 1.

In each of the embodiments described above, the MOSFETs each are constructed into the N channel type, resulting in being rendered turned off when a potential at the gate is zero relative to a potential at the source and turned on when a potential at the gate is positive relatively to a potential at the source. Alternatively, it may be constructed into the P channel type, so that it is rendered turned on when a potential at the gate is zero relative to that at the source and turned off when the former is positive relatively to the latter.

Figure 11:
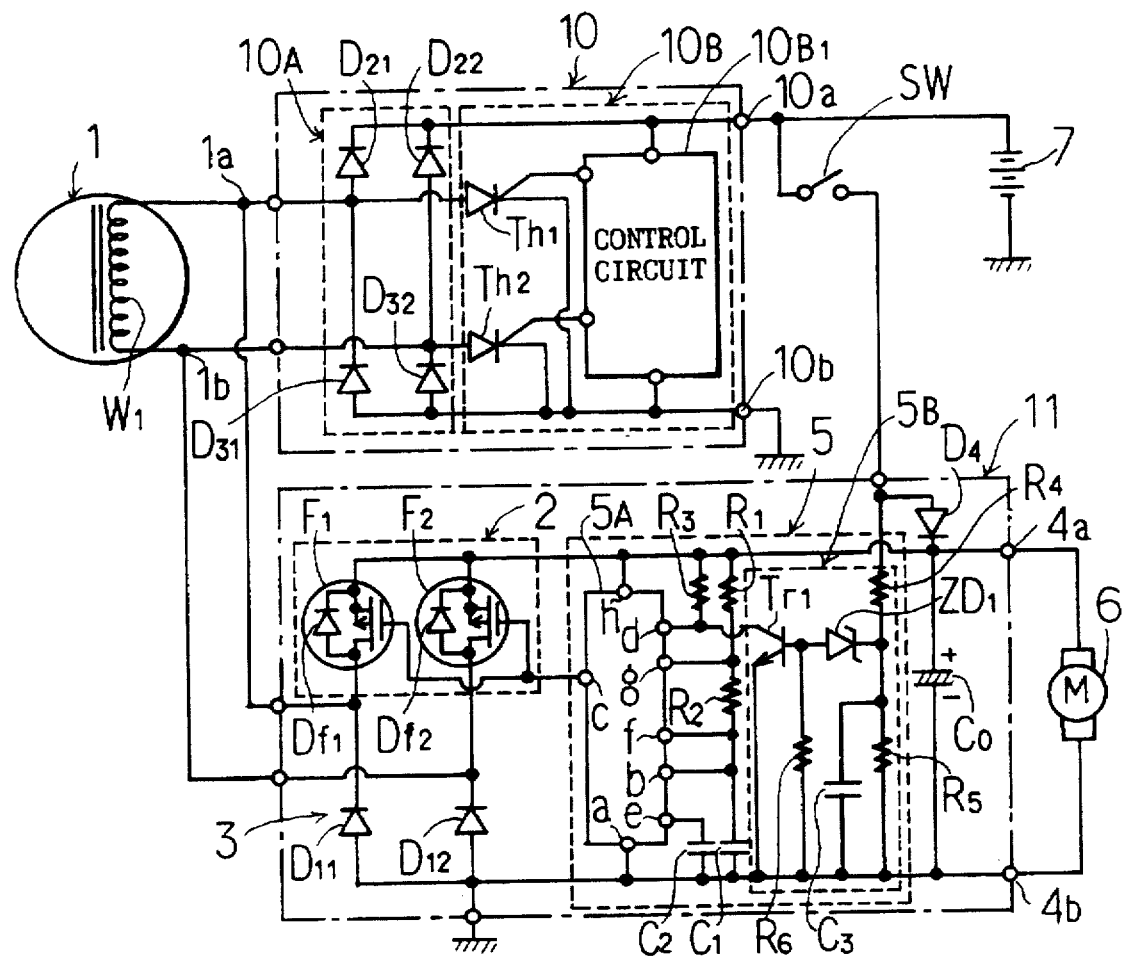
FIG. 11 is a circuit diagram showing a further embodiment of a power device for an internal combustion engine according to the present invention.

Referring now to FIG. 11, a further embodiment of a power device for an internal combustion engine according to the present invention is illustrated, wherein MOSFETs of the P channel type are incorporated. More particularly, in the illustrated embodiment, first and second MOSFETs F1 and F2 of the P channel type have sources connected together and drains connected to output terminals 1a and 1b of an AC magneto 1, respectively. The output terminals 1a and 1b of the AC magneto 1 are respectively connected to cathodes of first and second rectification diodes D11 and D12, of which abodes are connected together and then grounded. The MOSFETs F1 and F2 cooperate with each other to provide a switch circuit 2 and have parasitic diodes Df1 and Df2 incorporated therein, respectively, which cooperate with the diodes D11 and D12 to provide a diode bridge single-phase full-wave rectification circuit 3. The power device of the illustrated embodiment likewise includes a rectification power section 10 having an output terminal arranged on a positive polarity side thereof, which is connected through a switch SW to an anode of a diode D4.

In the illustrated embodiment thus constructed, the MOSFETs F1 and F2 are rendered turned on during a period for which a rectangular waveform drive signal generated from an FET control circuit 5 is kept at a low level and turned off during a period for which the drive signal is kept at a high level.

The remaining part of the illustrated embodiment may be constructed in substantially the same manner as the embodiment of FIG. 1 described above.

In each of the embodiments described above, the rectification circuit 3 is formed in the boosting circuit 11, so that a DC voltage is also fed from the boosting circuit 11 to the load connection terminals 4a and 4b. Alternatively, the boosting circuit 11 may be constructed so as to carry out only boosting operation.

Figure 12:
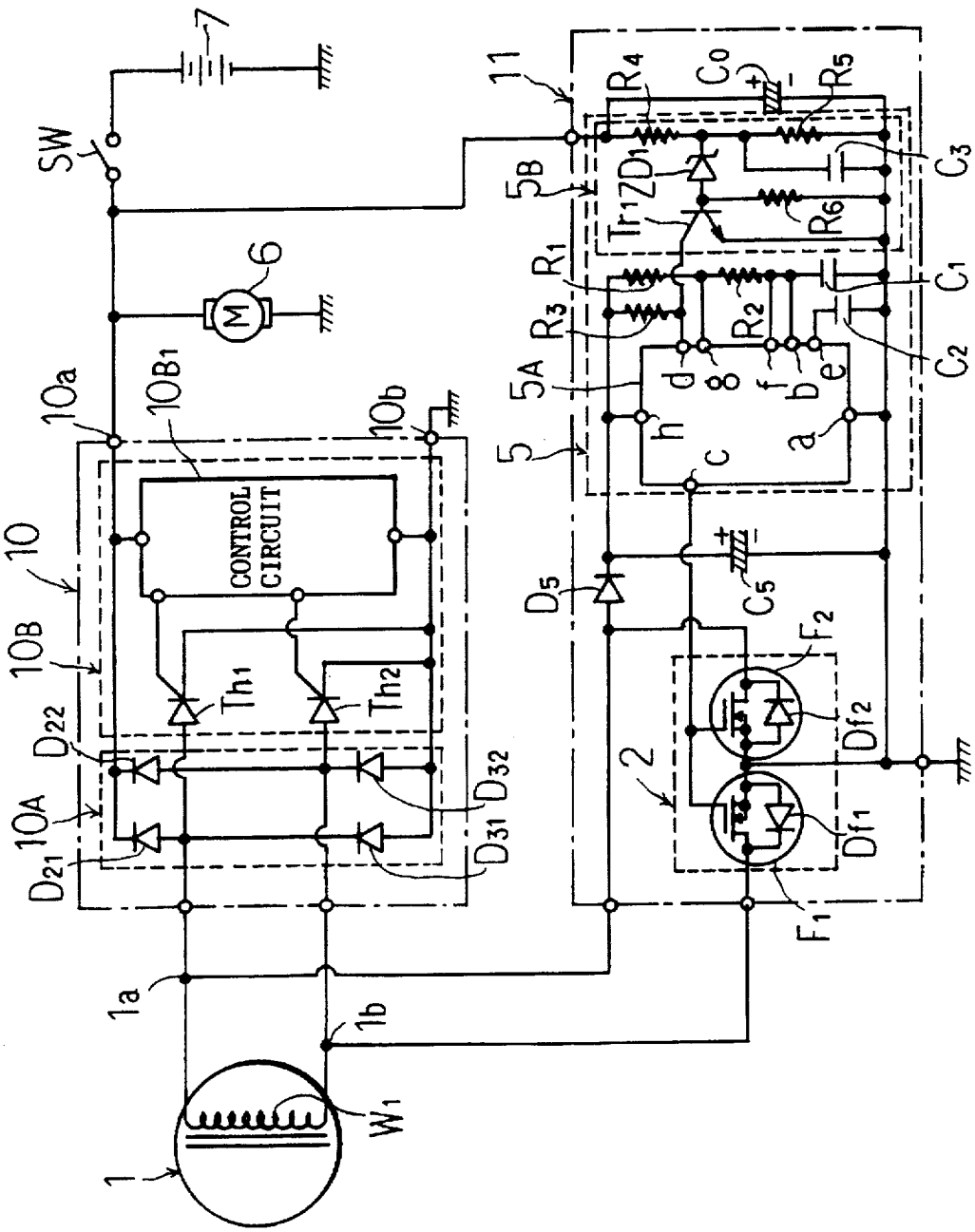
FIG. 12 is a circuit diagram showing still another embodiment of a power device for an internal combustion engine according to the present invention.
Figure 13:
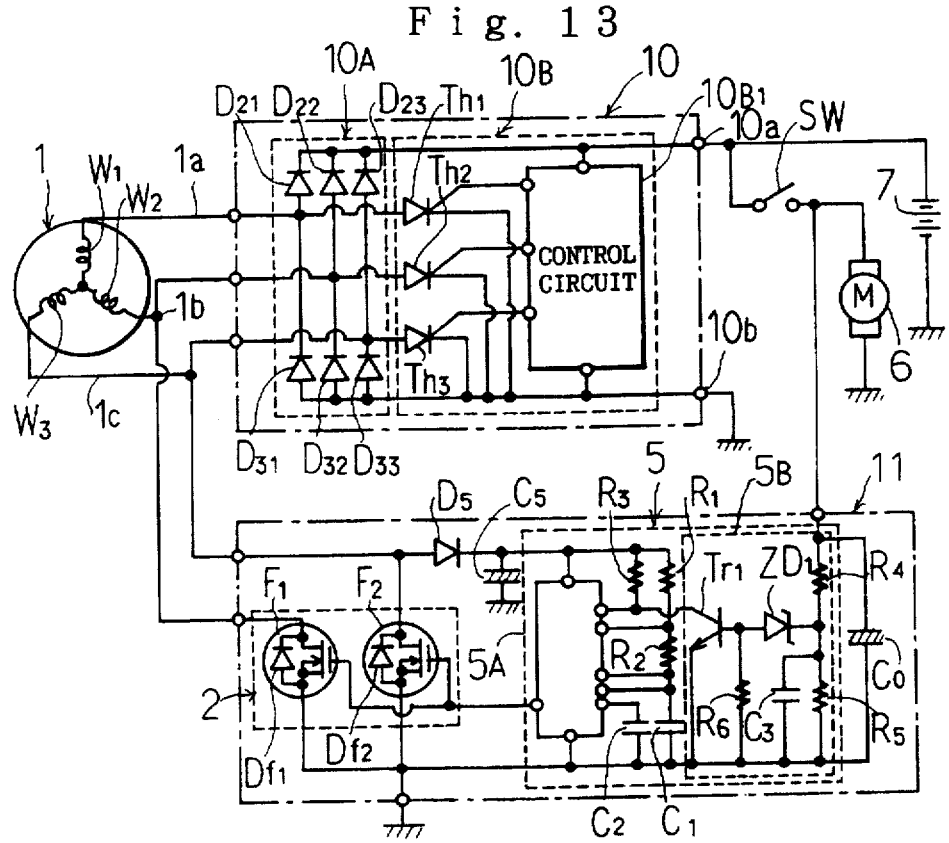
FIG. 13 is a circuit diagram showing a still further embodiment of a power device for an internal combustion engine according to the present invention.
Figure 14:
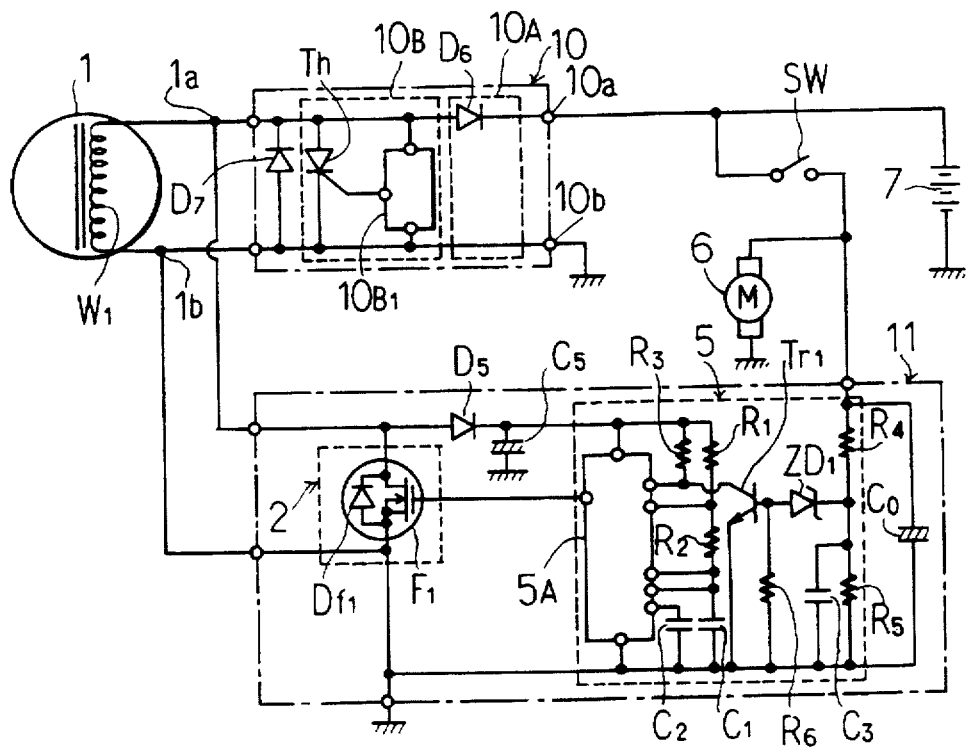
FIG. 14 is a circuit diagram showing yet another embodiment of a power device for an internal combustion engine according to the present invention.

Referring now to FIGS. 12 to 14, yet further embodiments of a power device for an internal combustion engine according to the present invention are illustrated, each of which is constructed in such a manner that a boosting circuit 11 carries out only boosting operation.

More particularly, in the embodiment of FIG. 12, an AC magneto 1 has output terminals 1a and 1b respectively connected to drains of MOSFETs F1 and F2 of the N channel type, which cooperate with each other to provide a switch circuit 2. The MOSFETs F1 and F2 have sources connected together and then grounded. The output terminal la of the AC magneto 1 is connected through a diode D5 to a power terminal h of a timer IC 5A, so that an output of the AC magneto subjected to half-wave rectification permits the timer IC 5A to be fed with a power supply voltage. A smoothing capacitor C5 is connected between a cathode of the diode D5 and the ground.

In the illustrated embodiment, a rectification power section 10 has output terminals arranged so as to act as load connection terminals 4a and 4b of the power device of the illustrated embodiment, between which a pump motor 6 is connected. Also, between the load connection terminals 4a and 4b is connected a battery 7 through a switch SW. Further, a series circuit of resistors R4 and R5 of a reset circuit 5B is connected between the load connection terminals 4a and 4b so as to act as a voltage dividing circuit. The remaining part of the illustrated embodiment may be constructed in substantially the same manner as the embodiment of FIG. 1.

In the embodiment of FIG. 12 described above, when an output voltage of the rectification power section 10 is at a set level or below, an astable multivibrator having a timer IC 5A incorporated therein feeds the MOSFETs F1 and F2 with a rectangular-waveform drive signal. This causes the MOSFETs F1 and F2 to carry out on-off operation, to thereby operate a current flowed through a generating coil of the AC magneto 1, resulting in inducing a high voltage across the generating coil. The voltage thus induced is then rectified by the rectification power section 10 and then fed to the load. When a rotational speed of an internal combustion engine is increased to a degree sufficient to cause an output voltage of the rectification power section 10 to exceed the set level, the reset circuit. 5B stops oscillation of the astable multivibrator, resulting in boosting operation being interrupted.

In the embodiment of FIG. 13, an AC magneto 1 has three output terminals 1a to 1c, resulting in generating a three-phase AC voltage. Of the three output terminals 1a to 1c, two output terminals 1b and 1c are respectively connected to drains of MOSFETs F1 and F2, of which sources are connected together and then grounded. Also, in the illustrated embodiment, a rectification power section 10 has output terminals defined so as to act as load connection terminals 4a and 4b, respectively, so that a voltage obtained between the load connection terminals 4a and 4b is applied through a switch SW to a pump motor 6. The remaining part of the illustrated embodiment may be constructed in substantially the same manner as the embodiment of FIG. 10. Thus, in the illustrated embodiment, when an output voltage of the rectification power section 10 is at a set level or below, the MOSFETs F1 and F2 carry out on-off operation to boost a two-phase output of the AC magneto; whereas when the output voltage exceeds the set level, the boosting operation is stopped.

In the embodiment of FIG. 14, an AC magneto 1 is constructed so as to output a single-phase AC voltage and has output terminals 1a and 1b, which are respectively connected to a drain and a source of a single MOSFET F1 of the N channel type, of which the source is then grounded. The remaining part of the boosting circuit 11 may be constructed in substantially the same manner as in the embodiment of FIG. 13.

A rectification power section 10 includes a half-wave rectification circuit 10A for subjecting an output voltage of the AC magneto 1 to half-wave rectification through a diode D6 to feed it to load connection terminals 4a and 4b and a voltage regulator 10B. The voltage regulator 10B includes a thyristor Th connected between the output terminals 1a and 1b of the AC magneto 1 and a control circuit 10B1 for feeding the thyristor Th with a trigger signal when a voltage between the load connection terminals 4a and 4b exceeds a predetermined adjustment level.

In the embodiment of FIG. 14, an output of the AC magneto 1 subjected to half-wave rectification is fed through the load connection terminals 4a and 4b to a load. When an output voltage of the rectification power section is at a set level or below, a drive signal is fed from an FBT control circuit 5 to the MOSFET F1, so that on-off operation of the MOSFET permits an output voltage of the AC magneto 1 to be boosted. The voltage thus boosted is subjected to half-wave rectification through the rectification power section 10 and then fed to the load.

As can be seen from the foregoing, the present invention is so constructed that the switch circuit in which the MOSFETs acting as a resistor when it is fed with a drive signal are incorporated operates a current flowing through the generating coil of the AC magneto, to thereby boost an output voltage of the magneto. Such construction, even when a voltage is induced in a slight amount across the AC magneto, permits a current to be flowed through the MOSFETs to the generating coil, to thereby boost the AC magneto. Therefore, the power device of the present invention permits a relatively high voltage to be applied to a load even during a highly low rotational speed of an internal combustion engine, resulting in the load being driven even during a highly low engine speed.

Also, the present invention permits the MOSFETs to carry out on-off operation only when an output voltage of the rectification power section is at a set level or below, so that a period during which the MOSFETs carry out on-off operation is restricted to a short period of time during starting operation of an internal combustion, to thereby reduce generation of heat from the MOSFETs. This results in a heat sink for each of the MOSFETs being small-sized, to thereby prevent large-sizing of the power device.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A power device for an internal combustion engine, comprising:

an AC magneto driven by the internal combustion engine and including output terminals;

a rectification power section equipped with a voltage regulator and constructed so as to output a DC voltage adjusted to be at a predetermined adjustment level or below while using said AC magneto as a power supply therefor;

a boosting switch circuit including at least one MOSFET acting as a switching element and arranged so as to carry out short-circuit between said output terminals of said AC magneto;

a FET control circuit for controlling said MOSFET depending on an output voltage of said rectification power section in a manner to feed said MOSFET of said boosting switch circuit with a drive signal of a rectangular waveform to cause said MOSFET to carry out on-off operation when said output voltage of said rectification power section is at a set level or below and keep said MOSFET turned off when said output voltage of said rectification power section exceeds the set level; and said drive signal having a frequency higher than a frequency of an output of said magneto.

2. A power device as defined in claim 1, wherein said FET control circuit carries out operation while using said AC magneto as a power supply therefor.

3. A power device for an internal combustion engine, comprising:

an AC magneto including n (n: an integer of 2 or more) output terminals and driven by the internal combustion engine to generate a single-phase or polyphase AC voltage between each two of said n output terminals;

a rectification power section including a rectification circuit for subjecting the AC voltage generated between each two of said n output terminals of said AC magneto to full-wave rectification and a voltage regulator for keeping an output of said rectification circuit at a predetermined adjustment level or below;

a boosting switch circuit including a plurality of MOSFETs of which drains are respectively connected to said n output terminals of said AC magneto and sources are connected together;

a FET control circuit for controlling said MOSFETs of said boosting switch circuit depending on an output voltage of said rectification power section in a manner to feed said MOSFETs of said boosting switch circuit with a rectangular-waveform drive signal of an identical phase repeatedly generated to cause said MOSFETs to concurrently carry out on-off operation when said output voltage of said rectification power section is at a set level or below and keep said MOSFETs turned off when said output voltage of said rectification power section is above the set level; and said rectangular-waveform drive signal having a frequency higher than a frequency of an output of said magneto.

4. A power device as defined in claim 3, wherein said FET control circuit carries out operation while using said AC magneto as a power supply therefor.

5. A power device for an internal combustion engine, comprising:

an AC magneto including n (n: an integer of 2 or more) output terminals and driven by the internal combustion engine to generate a single-phase or polyphase AC voltage between each two of said n output terminals;

a rectification power section including a rectification circuit for subjecting the AC voltage generated between each two of said n output terminals of said AC magneto to full-wave rectification and a voltage regulator for keeping an output of said rectification circuit at a predetermined adjustment level or below;

a boosting switch circuit including n MOSFETs of the N channel type of which drains are respectively connected to said n output terminals of said AC magneto and sources are connected together;

n rectification diodes of which anodes are respectively connected to said n output terminals of said AC magneto and cathodes are connected together; and a FET control circuit for controlling said n MOSFETs of said boosting switch circuit depending on an output voltage of said rectification power section in a manner to feed said n MOSFETs with a rectangular-waveform drive signal of an identical phase repeatedly generated to cause said n MOSFETs to concurrently carry out on-off operation when said output voltage of said rectification power section is at a set level or below and keep said n MOSFETs turned off when said output voltage of said rectification power section is above the set level;

said n MOSFETs each having a parasitic diode in a drain-source circuit thereof;

said parasitic diodes cooperating with said n rectification diodes to constitute a diode bridge full-wave rectification circuit, an output of said diode bridge full-wave rectification circuit and an output of said rectification power section being applied to load connection terminals; and said rectangular-waveform drive signal having a frequency higher than a frequency of an output of said magneto.

6. A power device as defined in claim 5, wherein said FET control circuit carries out operation while using said AC magneto as a power supply therefor.

7. A power device for an internal combustion engine, comprising:

an AC magneto including n (n: an integer of 2 or more) output terminals and driven by the internal combustion engine to generate a single-phase or polyphase AC voltage between each two of said n output terminals;

a rectification power section including a rectification circuit for subjecting the AC voltage generated between each two of said n output terminals of said AC magneto to full-wave rectification and a voltage regulator for keeping an output of said rectification circuit at a predetermined adjustment level or below;

n MOSFETs of the P channel type of which drains are respectively connected to said n output terminals of said AC magneto and sources are connected together;

n rectification diodes of which cathodes are respectively connected to said n output terminals of said AC magneto and anodes are connected together; and a FET control circuit for controlling said n MOSFETs of said boosting switch circuit depending on an output voltage of said rectification power section in a manner to feed said n MOSFETs with a rectangular-waveform drive signal of an identical phase repeatedly generated to cause said n MOSFETs to concurrently carry out on-off operation when said output voltage of said rectification power section is at a set level or below and keep said n MOSFETs turned off when said output voltage of said rectification power section is above the set level;

said n MOSFETs each having a parasitic diode in a drain-source circuit thereof;

said parasitic diodes cooperating with said n rectification diodes to constitute a diode bridge full-wave rectification circuit, an output of said diode bridge full-wave rectification circuit and an output of said rectification power section being applied to load connection terminals; and said rectangular-waveform drive signal having a frequency higher than a frequency of an output of said magneto.

8. A power device as defined in claim 7, wherein said FET control circuit carries out operation while using said AC magneto as a power supply therefor.

* * * * *

UNITED STATES PATENT AND TRADEMARK OFFICE
CERTIFICATE OF CORRECTION

PATENT NO. : 5,714,871
DATED : February 3, 1998
INVENTOR(S) : Endou

It is certified that error appears in the above-identified patent and that said Letters Patent is hereby corrected as shown below:

Column 2, line 36, delete "VCB" and insert --VCE--.

Column 3, line 18, delete "FBT" and insert --FET--.

Column 3, line 46, delete "of" and insert --or--.

Column 4, line 5, delete "FBT" and insert --FET--.

Column 4, line 24, delete "FBT" and insert --FET--.

Column 6, line 9, delete "circuit S" and insert --circuit 5--.

Column 6, line 24, delete "circuit 5" and insert --circuit 3--.

Column 6, line 36, delete "FBT" and insert --FET--.

Column 6, line 36, delete "circuit S" and insert --circuit 5--.

Column 6, line 39, delete "SA" and insert --5A--.

Column 6, line 44, delete ""uPD SSSS"" and insert --"uPD 5555"--.

Column 8, line 51, delete "RS" and insert --R5--.

UNITED STATES PATENT AND TRADEMARK OFFICE
CERTIFICATE OF CORRECTION

PATENT NO. : 5,714,871
DATED : February 3, 1998
INVENTOR(S) : Endou

It is certified that error appears in the above-identified patent and that said Letters Patent is hereby corrected as shown below:

Column 9, line 1, delete "FBT" and insert --FET--.

Column 9, line 27, delete "(B)" and insert --(E)--.

Column 9, line 66, after "C" delete --.-- (period).

Column 10, line 2, after "C" delete --.-- (period).

Column 13, line 7, delete "F1'" and insert --F1--.

Column 13, line 15, delete "S" and insert --5--.

Column 13, line 20, delete "PET and insert --FET--.

Column 13, line 23, delete "Starting" and insert
    --starting--.

Column 13, line 28, delete "circuit S" and insert
    --circuit 5--.

UNITED STATES PATENT AND TRADEMARK OFFICE
CERTIFICATE OF CORRECTION

PATENT NO. : 5,714,871
DATED : February 3, 1998
INVENTOR(S) : Endou

It is certified that error appears in the above-indentified patent and that said Letters Patent is hereby corrected as shown below:

Column 13, line 63, delete "FBT" and insert --FET--.

Column 15, line 24, delete "RS" and insert --R5--.

Column 16, line 18, delete "FBT" and insert --FET--.

Signed and Sealed this

Twenty-fifth Day of August, 1998

Attest:

BRUCE LEHMAN

Attesting Officer

Commissioner of Patents and Trademarks